US012283173B2

(12) United States Patent
Deus et al.

(10) Patent No.: US 12,283,173 B2
(45) Date of Patent: Apr. 22, 2025

(54) TRACKING DEVICE COUPLING MECHANISM

(71) Applicants: Troy Adam Deus, Atlanta, GA (US); Joni Michelle Deus, Atlanta, GA (US); Robert J. Thomas, Atlanta, GA (US)

(72) Inventors: Troy Adam Deus, Atlanta, GA (US); Joni Michelle Deus, Atlanta, GA (US); Robert J. Thomas, Atlanta, GA (US)

(*) Notice: Subject to any disclaimer, the term of this patent is extended or adjusted under 35 U.S.C. 154(b) by 0 days.

(21) Appl. No.: 18/755,553

(22) Filed: Jun. 26, 2024

(65) Prior Publication Data

US 2025/0029470 A1 Jan. 23, 2025

Related U.S. Application Data

(63) Continuation of application No. 18/582,849, filed on Feb. 21, 2024.

(60) Provisional application No. 63/514,083, filed on Jul. 17, 2023.

(51) Int. Cl.
*G08B 21/18* (2006.01)

(52) U.S. Cl.
CPC .................................... *G08B 21/18* (2013.01)

(58) Field of Classification Search
CPC ............................ G08B 13/2434; G08B 21/18
USPC ....................................................... 340/572.8
See application file for complete search history.

(56) References Cited

U.S. PATENT DOCUMENTS

| | | | | |
|---|---|---|---|---|
| 6,493,033 B1 * | 12/2002 | Glogan | H04N 5/772 | |
| | | | 360/99.06 | |
| 7,188,978 B2 * | 3/2007 | Sharrah | F21S 9/02 | |
| | | | 362/396 | |
| 11,156,419 B1 * | 10/2021 | Wang | F41C 33/002 | |
| 2009/0122527 A1 * | 5/2009 | Galli | F41G 11/003 | |
| | | | 362/110 | |
| 2016/0165192 A1 * | 6/2016 | Saatchi | H04N 7/185 | |
| | | | 386/227 | |
| 2023/0010591 A1 * | 1/2023 | Malichen-Snyder | F41A 17/54 | |

* cited by examiner

*Primary Examiner* — Brian Wilson
(74) *Attorney, Agent, or Firm* — BEKIARES ELIEZER LLP

(57) ABSTRACT

A device may include a body at least partially defining a cavity configured to receive and retain a tracking device. An attachment mechanism connected to the body may have: a first arm configured to slide inward towards a centerline of the body from a first side, a second arm configured to oppose the first arm and slide inward towards the centerline of the body from a second side, and a tamperproof screw removably connecting the first arm to the second arm such that rotation of the screw adjusts a distance between the first arm and the second arm, wherein at least a portion of an item to be tracked is configured to be retained between the first arm and the second arm, and wherein, when the attachment mechanism retains the body in an engaged state, the tracking device coupling mechanism is immobilized with respect to the item to be tracked.

19 Claims, 13 Drawing Sheets

TRACKING DEVICE COUPLING MECHANISM

RELATED APPLICATION

This application is a Continuation of U.S. application Ser. No. 18/582,849 filed on Feb. 21, 2024, which claims the benefit under 35 U.S.C. § 119(e) of U.S. Provisional Application No. 63/514,083 filed on Jul. 17, 2023, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to tracking devices, and more particularly a device for locking and coupling a tracking device to an object, such as a firearm.

BACKGROUND

Tracking devices, such as GPS transponders, Passive Integrated Transponder (PIT) tags, and other tracking devices are used to track a user's belongings. In particular, tracking devices are used to track cars, luggage, and a variety of important possessions. However, one large downside to tracking devices is that, once discovered, the tracking devices are easily removed, rendering them no longer useful for their intended purpose.

One strategy is to make the tracking devices small enough so as to be unobtrusive or difficult to identify. Another strategy is to place the tracking devices in an interior portion of the object, or another portion that is not generally visible to an observer. For example, a tracking device may be positioned inside a suitcase, or on the underside of an automobile. However, for smaller objects and objects that are generally devoid of interior cavities, this is largely infeasible.

Accordingly, there is a need for a device that retains the tracking device on the device being tracked, such that the tracking device is more difficult to remove, tamper with, or otherwise adjust without explicit action from the owner.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure relates to various embodiments of a tracking device coupling mechanism and methods for tracking an item. These embodiments are described in a manner that does not imply any particular hierarchy or priority of one embodiment over another, and all components are treated with equal importance.

A tracking device coupling mechanism may comprise a body that at least partially defines a cavity configured to receive and retain a tracking device. An attachment mechanism connected to the body may include a first arm configured to slide inward towards a centerline of the body from a first side. A second arm, configured to oppose the first arm, may also slide inward towards the centerline of the body from a second side. A tamperproof screw may removably connect the first arm to the second arm, wherein rotation of the tamperproof screw adjusts a distance between the first arm and the second arm. At least a portion of an item to be tracked may be configured to be retained between the first arm and the second arm. When the attachment mechanism retains the body in an engaged state, the tracking device coupling mechanism may be immobilized with respect to the item to be tracked.

At least a portion of the body may be formed from a material that permits the passage of electromagnetic radiation therethrough. This portion of the body may be formed from plastic. The attachment mechanism may not be removable from the body while the tamperproof screw is retained in both the first arm and the second arm. The tamperproof screw may comprise a screw having a drive selected from one of several specific types, including a snake eye drive, a security Torx drive, a security hex drive, a 5-lobe Torx drive, a one-way clutch drive, a sentinel drive, a 7-point drive, or a proprietary drive. The item to be tracked may comprise a firearm, and the first arm and the second arm may be configured to retain a portion of an accessory rail of the firearm therebetween, such that the body is not moveable relative to the firearm.

The body may comprise a base that is removably attachable to the attachment mechanism, and a cap removably attachable to the base, wherein the cavity is defined between the base and the cap. The cap may be attached to the base using one or more screws, where the heads of these screws are covered by the attachment mechanism when installed. These screws may also be tamperproof screws. The one or more tamperproof screws of the body may use the same driver as the tamperproof screw of the attachment mechanism. A laser emitter may be attached to the body by the one or more screws, disposed adjacent to the cap. Additionally, the cavity may be open on at least one side, and the body may comprise a cassette hingedly mounted within the cavity. The cassette may be configured to retain the tracking device therein and to rotate between a first position within the body and a second position outside of the body. A set screw may be configured to selectively inhibit the rotation of the cassette. While the attachment mechanism attaches the tracking device coupling mechanism to the item to be tracked, at least a portion of the item to be tracked may inhibit the rotation of the cassette. The tracking device coupling mechanism may further comprise a laser emitter, wherein an adjusting screw allows for adjusting the aim of the laser emitter. Additionally, a flashlight may be included, wherein the flashlight emits white light.

A method for tracking an item may involve receiving a tracking device within a cavity defined by a body of a tracking device coupling mechanism. The tracking device may be enclosed within the cavity. The body may be positioned such that it abuts at least a portion of an item to be tracked. An attachment mechanism may be engaged to immobilize the body relative to the item. The item may be tracked based on the tracking device. The attachment mechanism may be disengaged, the body removed from the item, and the tracking device removed from the cavity.

This disclosure provides a detailed description of various embodiments of a tracking device coupling mechanism and methods for tracking an item. These embodiments are described in a manner that does not imply any particular hierarchy or priority of one embodiment over another, and all components are treated with equal importance.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
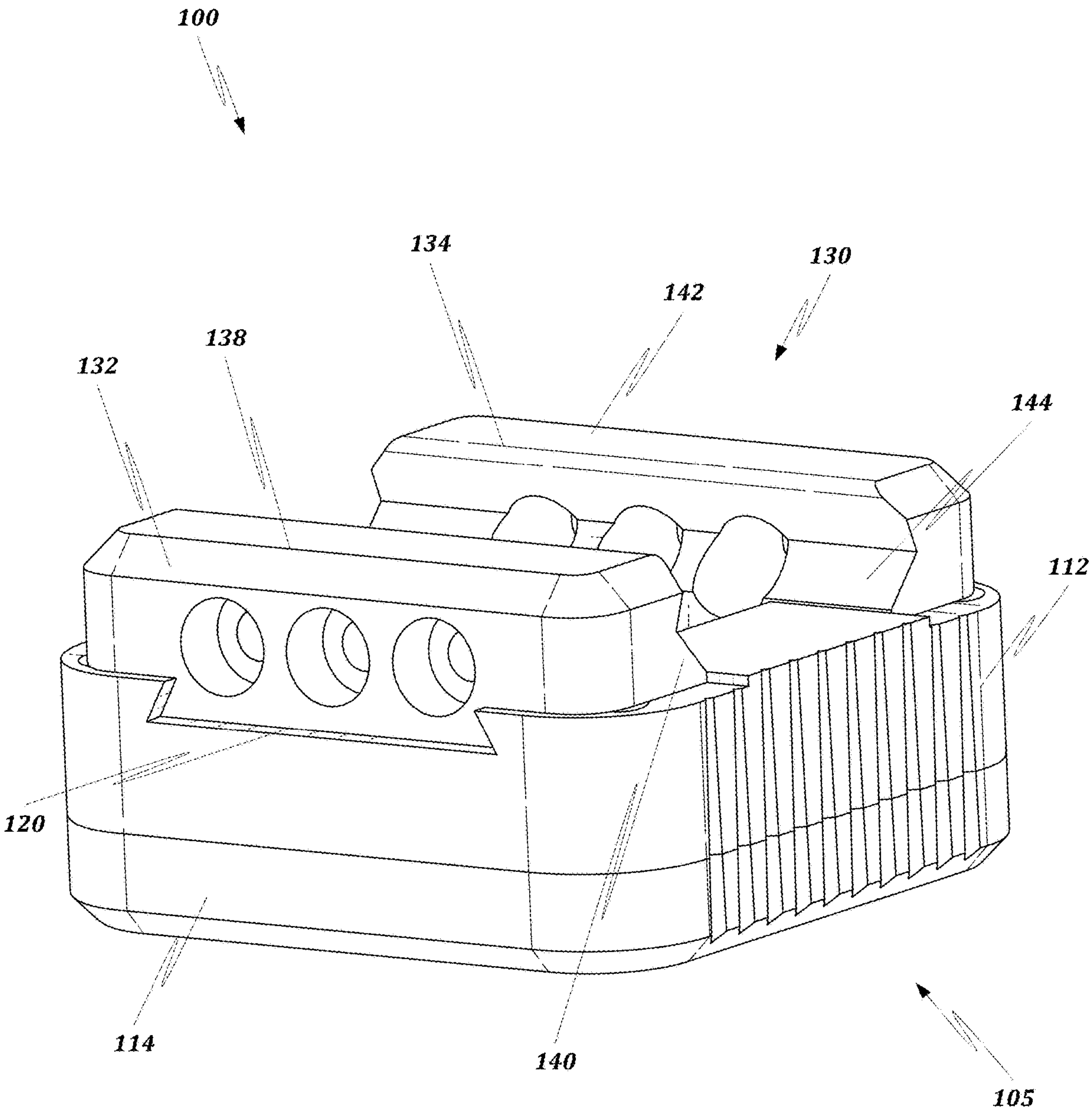
FIG. 1 is a perspective view of a first embodiment of a tracking device coupling mechanism.
Figure 2:
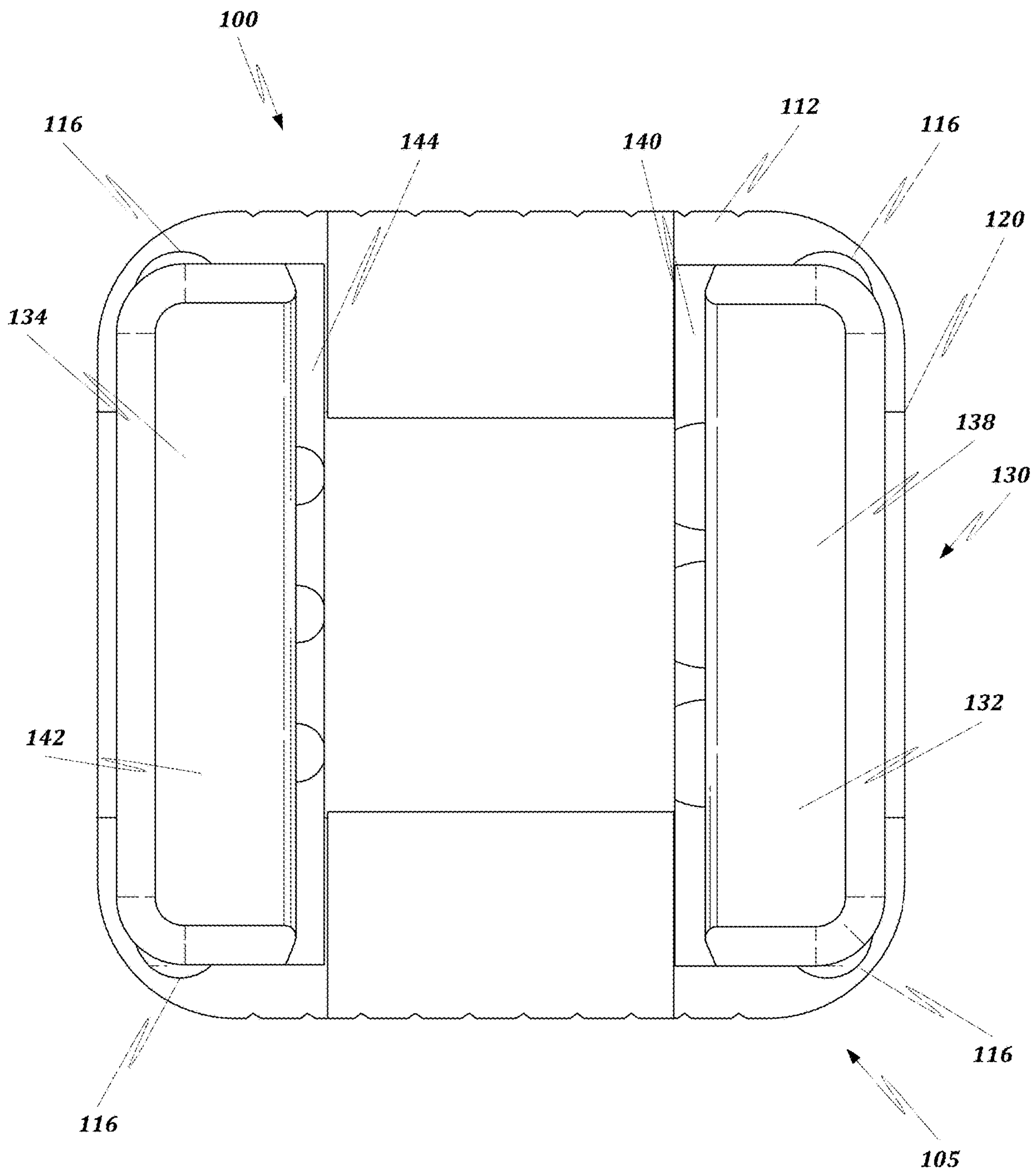
FIG. 2 is a top view thereof.
Figure 3:
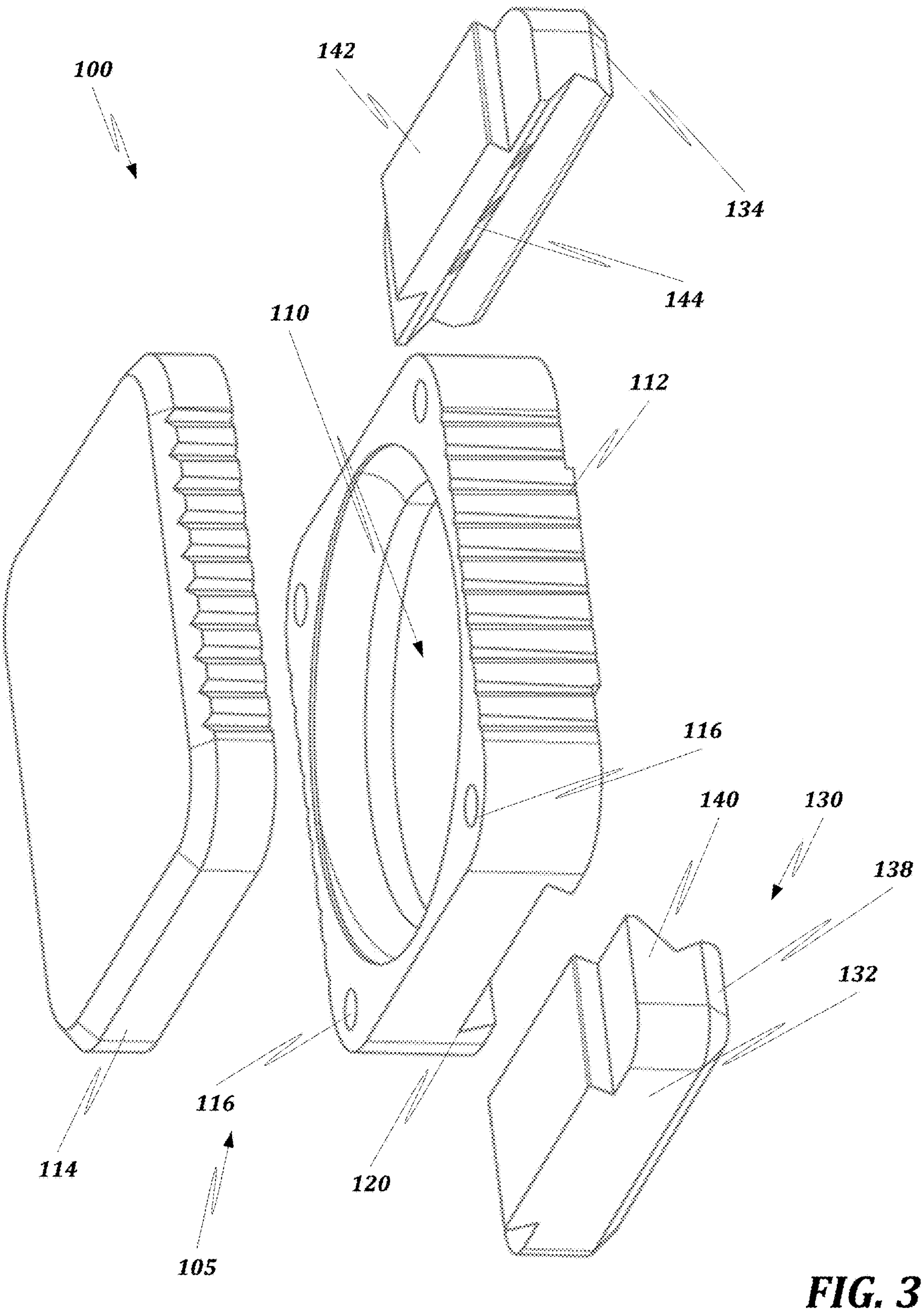
FIG. 3 is an exploded perspective view thereof.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a coupling mechanism for coupling a tracking device to an object, such as a firearm, embodiments of the present disclosure are not limited to use only in this context.

I. APPARATUS OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

In embodiments, a tracking device coupling mechanism may include a receptacle configured to receive and retain a tracking device, and an attachment mechanism configured to couple the receptacle to an object, such as a firearm or other portable object that a user may wish to track. The receptacle may define a cavity sized to receive and retain the tracking device, and a door that selectively limits access to the cavity. In embodiments, the door may be selectively opened using, for example, a clasp, a latch, a keyed mechanism, or any other means of releasably securing the door. The receptacle may further define one or more recesses for connecting the receptacle to the attachment mechanism.

The attachment mechanism may substantially immobilize the receptacle with respect to the item when engaged, and may permit movement of the receptacle when disengaged. The attachment mechanism may include a lock having a rigid, generally U-shaped bar and a pair of recesses in the receptacle for receiving the ends of the bar. In embodiments, at least a portion of the item may be surrounded by the bar and the receptacle, such that the item is retained by the lock. The lock may hold the receptacle tight against the item, thereby preventing access to the door in the receptacle while the lock is engaged and coupling the receptacle to the item. Alternatively or additionally, the attachment mechanism may include one or more security screws or anti-theft screws for attaching the receptacle to a bracket. At least a portion of the item may be surrounded by the bracket and the receptacle, such that the item is retained by the bracket. The bracket may hold the receptacle tight against the item, thereby preventing access to the door in the receptacle while the bracket attaches the receptacle to the item. The security screw or anti-theft screw may be difficult or impossible to remove without a particular screwdriver. In this way, the receptacle couples the tracking device to the item in such a way that the tracking device cannot be accessed, removed, destroyed, or otherwise tampered with.

In some embodiments (e.g., when the object to be tracked is a firearm), the object may already be equipped with one or more accessories. One such accessory may include a grip or handle that attaches to the object. In some situations, the grip or handle may include a hollow compartment accessible through a base of the added handle. The compartments may be designed to store various accessories, such as lubrication, batteries, and/or spare parts for replacement. The hollow compartment may also be used to house a tracking device. The compartment may receive an accessory that retains the tracking device in a fixed position relative to the accessory grip. One or more tamper-proof screws may be used to removably fix the accessory to the handle. In this way, the tracking device may be discretely housed within the accessory handle. Alternatively, the accessory may be formed such that the body has a handle shape, defining a cavity therein that is accessible from the handle base. The cavity may allow for insertion of a tracking tag therein, and the tracking tag may be held in position using one or more tamper-proof screws.

Additionally or alternatively, some embodiments of the present device may be formed to be retained inside the object to be tracked. As one particular example, some models of firearm include a small (e.g., approximately 2 cm×1 cm) cavity with an opening at the base of the handle. A small tracking tag assembly may fit within such a cavity. For example, the small tracking tag assembly may include a controller (e.g., an nRF51822 controller chip), a network device (e.g., a Bluetooth Module with antenna), and a power source (e.g., a coin cell battery, lithium ion battery, lithium polymer battery, etc.). In some embodiments, one or more tamper-proof screws may be used to removably retain the small tracking tag assembly within the object to be tracked.

Embodiments of the present disclosure may comprise methods, systems, and components comprising, but not limited to, at least one of the following:

A. A Body;

B. A Cavity Defined within the Body; and

C. An Attachment Mechanism.

In some embodiments, the present disclosure may provide an additional set of modules for further facilitating the software and hardware platform. The additional set of modules may comprise, but not be limited to:

D. A Laser Sight;

E. A Flashlight; and

F. A Motion Sensor.

Details with regards to each component are provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

a. receiving a tracking device within a cavity or receptacle;
b. enclosing the tracking device within the receptacle;
c. positioning the body such that the body abuts at least one side of an item to be tracked;
d. engaging the attachment mechanism to immobilize the receptacle relative to the item;
e. tracking the item based on the tracking device;
f. disengaging the attachment mechanism;
g. removing the body from the item; and
h. removing the tracking device from the cavity.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. SYSTEM CONFIGURATION

As shown in FIGS. 1-12, various embodiments of the present disclosure provide a tracking device coupling mechanism 100 comprised of a set of components, including, but not limited to, a body 105 and an attachment mechanism 130. The tracking device coupling mechanism 100 may optionally include one or more of a laser emitter 150 and a flashlight 160. That is, the tracking device coupling mechanism 100 may include:

A. A Body

As shown in FIGS. 1-12, the tracking device coupling mechanism 100 may comprise a body 105 at least partially defining a cavity or receptacle 110. The body 105 may be formed at least particularly from a material that allows electromagnetic radiation to pass therethrough. In embodiments, the material may be resilient, resisting physical trauma, such as attempts to cut and/or smash the body.

In embodiments, components of the body 105 may be formed from a durable, material that prevents tampering with, disabling, destroying, removing, or otherwise interacting with a tracking device retained in the receptacle 110, but does not prevent the tracking device from functioning (e.g., permitting a radio signal to pass through the receptacle 110). As examples, the body 105 may be formed from steel, aluminum, plastic, Kevlar, resin, and/or other materials.

In some embodiments, as shown in FIGS. 1-8, the body 105 may be formed from a base 112 and a cap 114, with the cavity or receptacle 110 defined between the base and the cap. The base 112 may include one or more apertures 116 extending therethrough and aligned with one or more corresponding apertures 118 in the cap 114. The one or more apertures 116, 118 may be threaded to allow for one or more corresponding screws to pass through the base and into the cap, thus securing the cap to the base. The one or more screws may be oriented such that each screw head is adjacent to the base 112 when the screw is inserted into the apertures 116, 118. The base 112 may further include one or more notches 120 configured to retain the attachment mechanism 130. The one or more notches 120 may be formed in a peripheral surface of the base 112. In embodiments, the one or more notches 120 may have a trapezoidal cross-section, being narrower at the surface of the base 112, and widening as they extend into the base.

In other embodiments, as shown in FIGS. 9-12, the body 105 may be formed as a monolithic unit. The body 105 may at least partially define the receptacle 110. The body 105 may include side walls 122 that extend rearwards to at least partially enclose a cassette 124. The cassette 124 may be retained within the cavity or receptacle 110. In embodiments, the cassette 124 may be configured to receive and retain a tracking device, and may assist in inserting and/or removing the tracking device into and/or from the receptacle 110. In some embodiments, the side walls 122 may include one or more perforations, allowing airflow into the cavity and helping to prevent or reduce any vacuum force formed by moving the cassette to an open position.

The cassette 124 may be formed from a durable material that does not disrupt electromagnetic radiation. For example, the cassette may be formed from a plastic material. The cassette 124 may be operated by pivoting the cassette about a pivot point 126. The pivot point 126 may be a hinge, such as a living hinge or other hinge for allowing the cassette 124 to pivot about the pivot point 126 between a closed or installed position and an open position. In some embodiments, a spring (not shown) may be used to bias the cassette 124 to return to the closed position when not being acted upon by a user. In some embodiments, a set screw may be used to prevent or inhibit movement of the cassette 124 about the pivot point 126. The set screw may include a head having a drive design that prevents normal engagement with a traditional screwdriver, such as a flathead screwdriver or a Phillips screwdriver. For example, the head of the set screw may have a drive such as a snake eye drive, a security Torx drive, a security hex drive, a 5-lobe Torx drive, a one-way clutch drive, a sentinel drive, a 7-point drive, a proprietary drive, or any other unique drive that may prevent adjustment or removal of the set screw without the unique driver.

B. A Cavity or Receptacle

As discussed above, the tracking device coupling mechanism 100 may comprise a cavity or receptacle 110 defined by the body 105. The receptacle 110 may be configured to receive and retain a tracking device and/or the cassette 124. The tracking device may be any tracking device used for tracking an associated device. For example, tracking devices may use GPS, Bluetooth communication, network triangulation, near field communication, and/or any other technology for determining a location of the tracking device. As shown in FIGS. 1-12, the receptacle 110 may be formed as a disc-shaped or generally cylindrical cavity, though the receptacle may also be formed in other shapes (e.g., cuboids, spheroids, conical or frustoconical shapes, etc.) without departing from the scope of the invention.

The cavity or receptacle 110 may be a hollow space surrounded by the body 105. For example, the cavity or receptacle may be formed by a hollow portion in the base 112 and/or a hollow portion in the cap 114, as shown in FIGS. 1-8. Alternatively, the receptacle 110 may be disposed in a portion of the monolithic body 105, retaining the cassette 124, as shown in FIGS. 9-12.

C. An Attachment Mechanism

As shown in FIGS. 1-12, the tracking device coupling mechanism 100 may comprise an attachment mechanism 130. In embodiments, the attachment mechanism 130 may comprise a first guide 132, a second guide 134, and a connecting screw 136.

The first guide 132 may include an arm 138 and a foot 140. The arm 138 may include one or more detents configured to grip or retain at least a portion of the object to which the tracking device coupling mechanism is to be attached. The foot 140 may be configured to slidably insert into a corresponding notch 120 of the body 105 towards a centerline of the body. The foot 140 may have a flared shape that is retained within the notch 120. In embodiments, the foot 140 may define one or more apertures configured to allow a portion of the connecting screw 136 to pass therethrough, but to retain the head of the connecting screw.

The first guide 134 may include an arm 142 and a foot 144. The arm 142 may include one or more detents configured to grip or retain at least a portion of the object to which the tracking device coupling mechanism is to be attached. In particular, at least a portion of the object may be retained between the arm 138 of the first guide 32 and the arm 142 of the second guide 134. As a particular example, in the case of a firearm, an accessory rail of the firearm may be retained between the first and second guides. The foot 144 may be configured to slidably insert into a corresponding notch 120 of the body 105 towards a centerline of the body. The foot 144 may have a flared shape that is retained within the notch 120. In embodiments, the foot 144 may define one or more apertures configured to allow a portion of the connecting screw 136 to pass therethrough. The one or more apertures may be threaded retain the threads of the connecting screw 136. In this way, turning the connecting screw may adjust the spacing between the first guide 132 and the second guide 134.

The connecting screw 136 may be a security screw or tamperproof screw having a head with a unique drive, requiring a corresponding unique adjustment tool or driver for adjustment or removal of the screw. For example, the head of the connecting screw 136 may have a drive such as a snake eye drive, a security Torx drive, a security hex drive, a 5-lobe Torx drive, a one-way clutch drive, a sentinel drive, a 7-point drive, a proprietary drive, or any other unique drive that may prevent adjustment or removal of the connecting screw 136 without the unique driver. The connecting screw 136 may be used to reduce the space between the guides 132, 134 and to apply inward pressure, towards a centerline of the mechanism 100 in a manner similar to a vise, until the guides substantially immobilize the attachment mechanism with respect to the object to which it is attached. The feet 140, 144, of the guides may retain the body 105 to the attachment mechanism 130, thereby substantially immobilizing the body with respect to the object is well.

Additionally or alternatively, the attachment mechanism 130 may include a generally U-shaped bracket or shackle and a lock body comprising two corresponding recesses to receive the posts. A locking mechanism may selectively retain the posts within the recesses. In some embodiments, the attachment mechanism 130 may include one or more security screws or anti-theft screws configured to connect the bracket to the receptacle. For example, the bracket may be inserted into a body of the receptacle using the recesses; one or more screw holes may allow the one or more security screws to engage the bracket, thereby securing the bracket to the receptacle. In embodiments, one or more (e.g., each) of the screws may have a head having a design that prevents normal engagement with a traditional screwdriver, such as a flathead screwdriver or a Phillips screwdriver.

In embodiments, when the attachment mechanism 130 is installed (e.g., when the feet 140, 144 are inserted into respective notches 120), the first and second guides 132, 134 may cover the one or more apertures 118 in the base 112. The guides 134, 134 may thus prevent or inhibit access to screws attaching the base 112 to the cap 114, thus preventing or inhibiting access to the cavity or receptacle 110 defined by the body 105. This may act as an extra measure to prevent a person from accessing, tampering with, or removing a tracking device from the receptacle 110.

D. A Laser Emitter

As shown in FIGS. 6-12, the tracking device coupling mechanism 100 may optionally include a laser emitter 150. The laser emitter 150 may be configured to emit light in the visible spectrum. For example, the laser emitter 150 may emit laser light in the visible spectrum, such as red or green laser light. As a particular example, the laser emitter 150 may emit laser light as a laser pointer. For example, if the tracking device coupling mechanism 100 is coupled to a firearm, the laser emitter 150 may emit a laser as an indicator of where the firearm is aimed. In some embodiments, the laser emitter 150 may further include an aim adjusting screw 152. The aim adjusting screw 152 may be used to fine tune aiming of the laser light emitted by the laser emitter 150. In embodiments, inclusion of the laser emitter 150 may allow the tracking device coupling mechanism 100 to function as a laser sight accessory in addition to in instead of retaining a tracking device.

Figure 6:
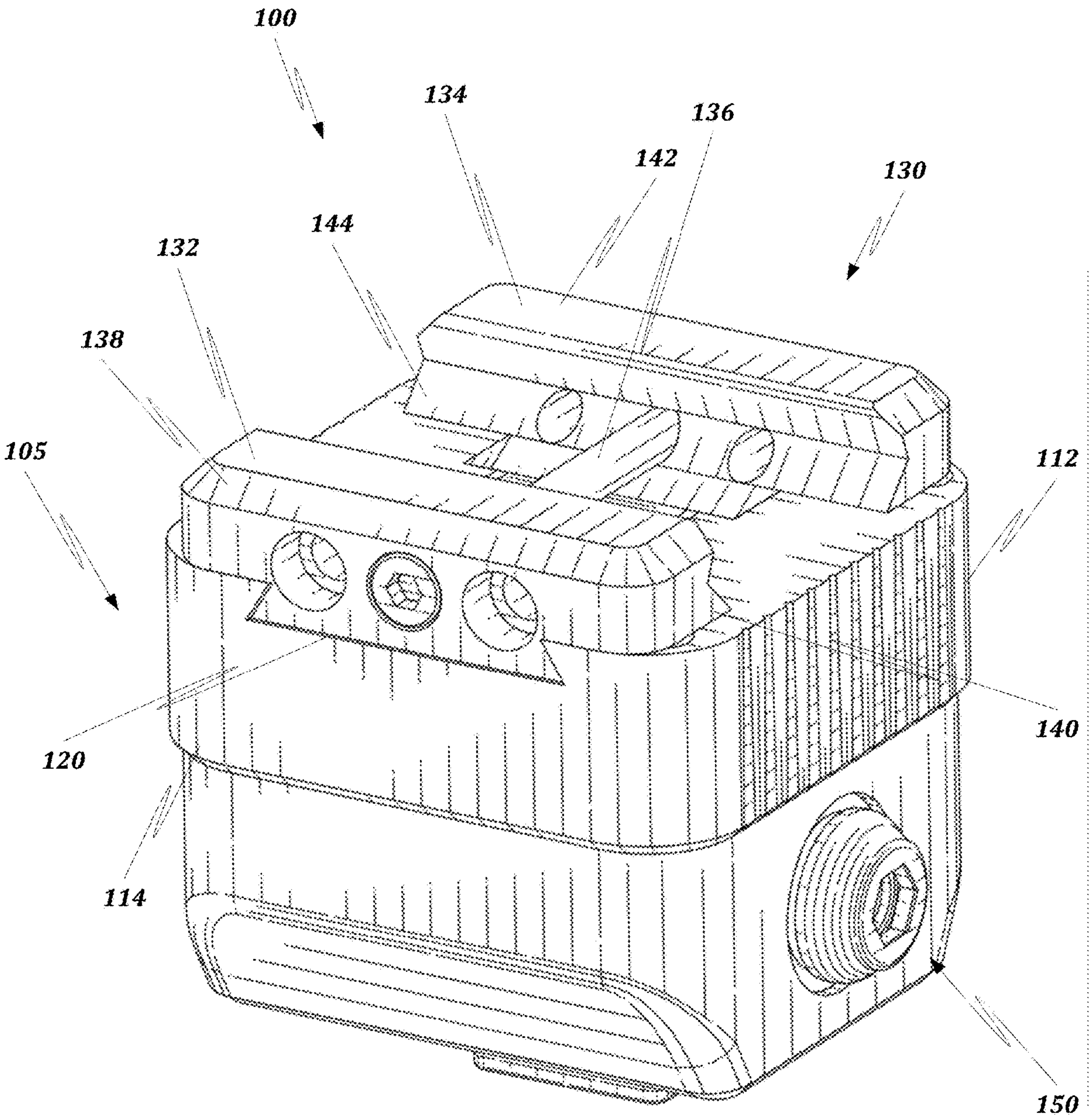
FIG. 6 is another perspective view thereof, showing a tamperproof screw installed in an attachment mechanism.
Figure 7:
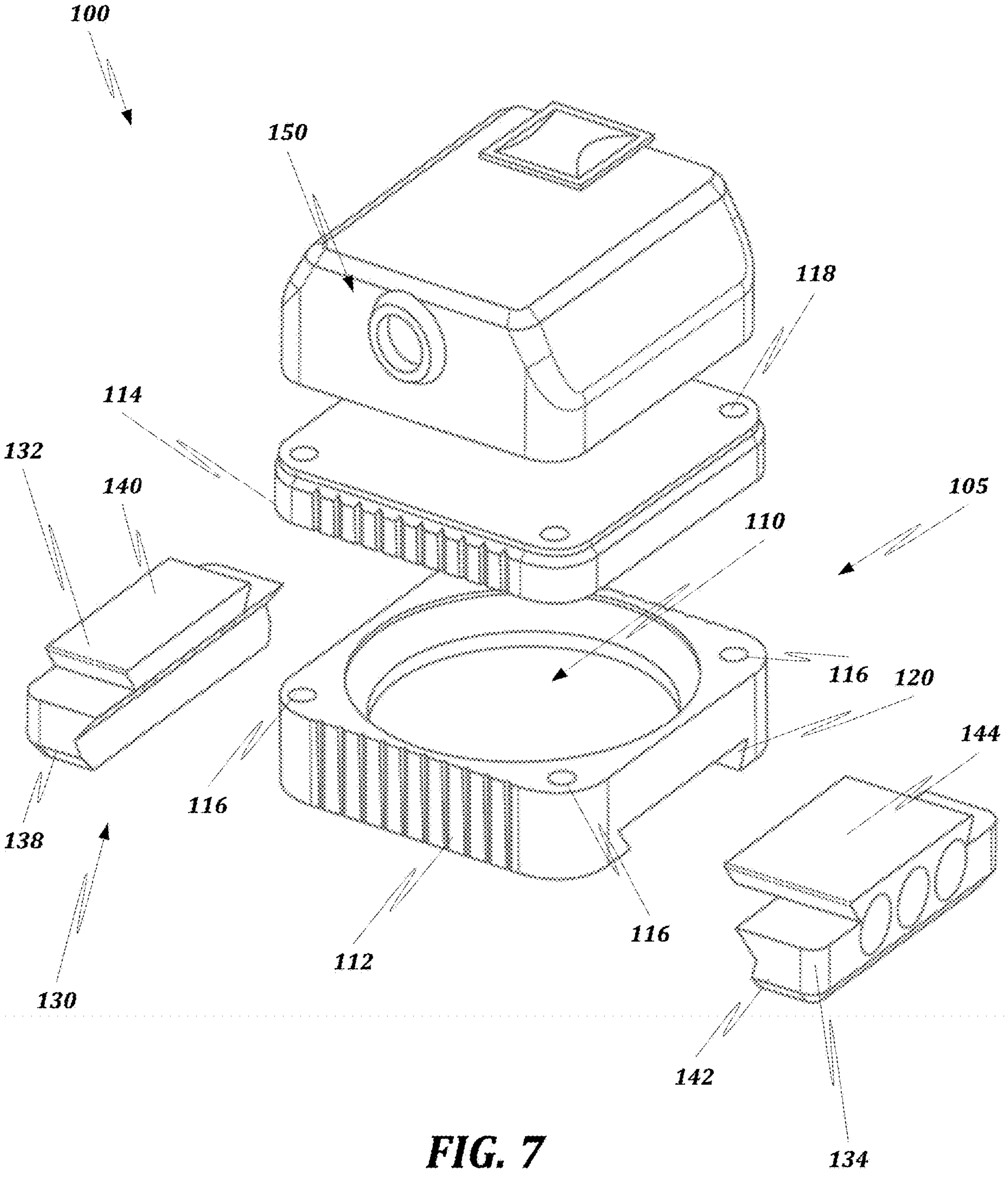
FIG. 7 is an exploded perspective view thereof.
Figure 8:
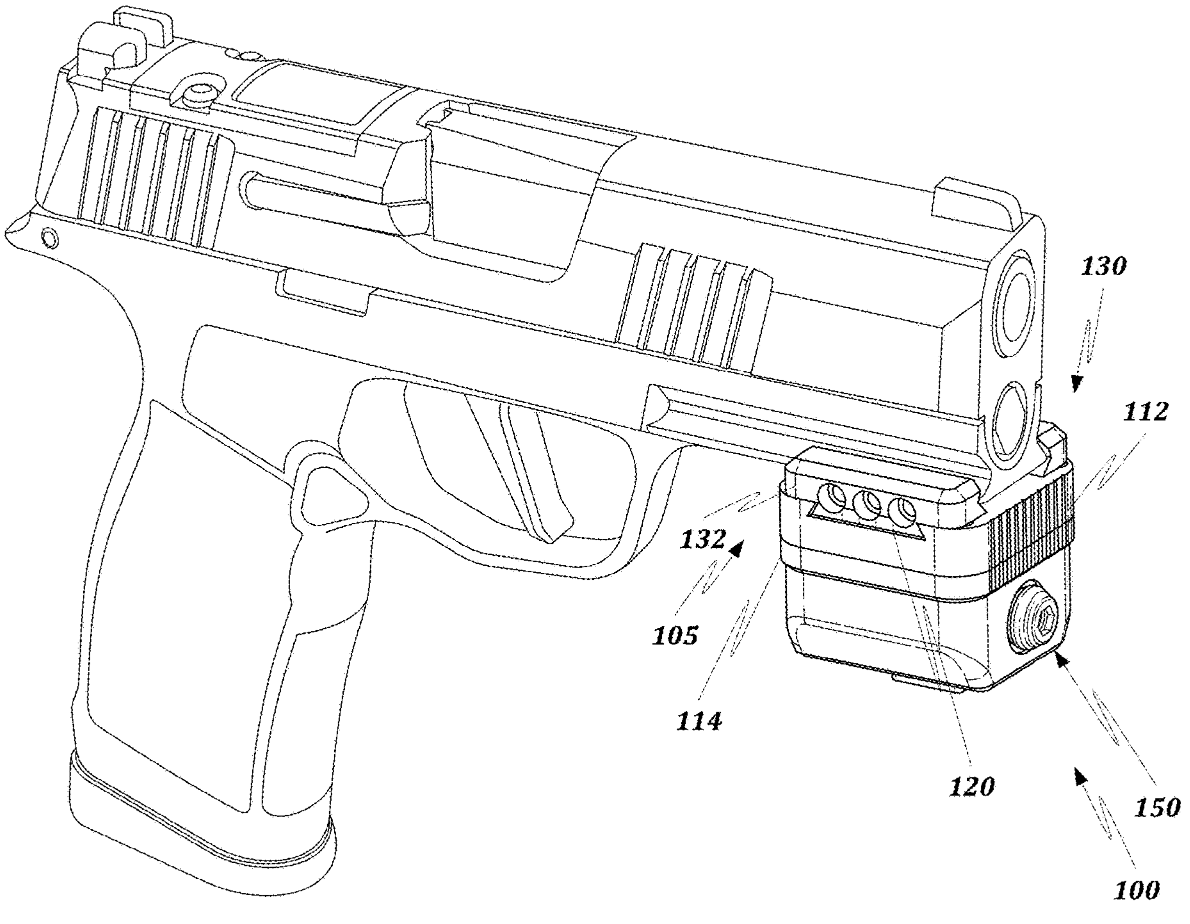
FIG. 8 is a perspective view showing the second embodiment of the tracking device coupling mechanism attached to a firearm.
Figure 9:
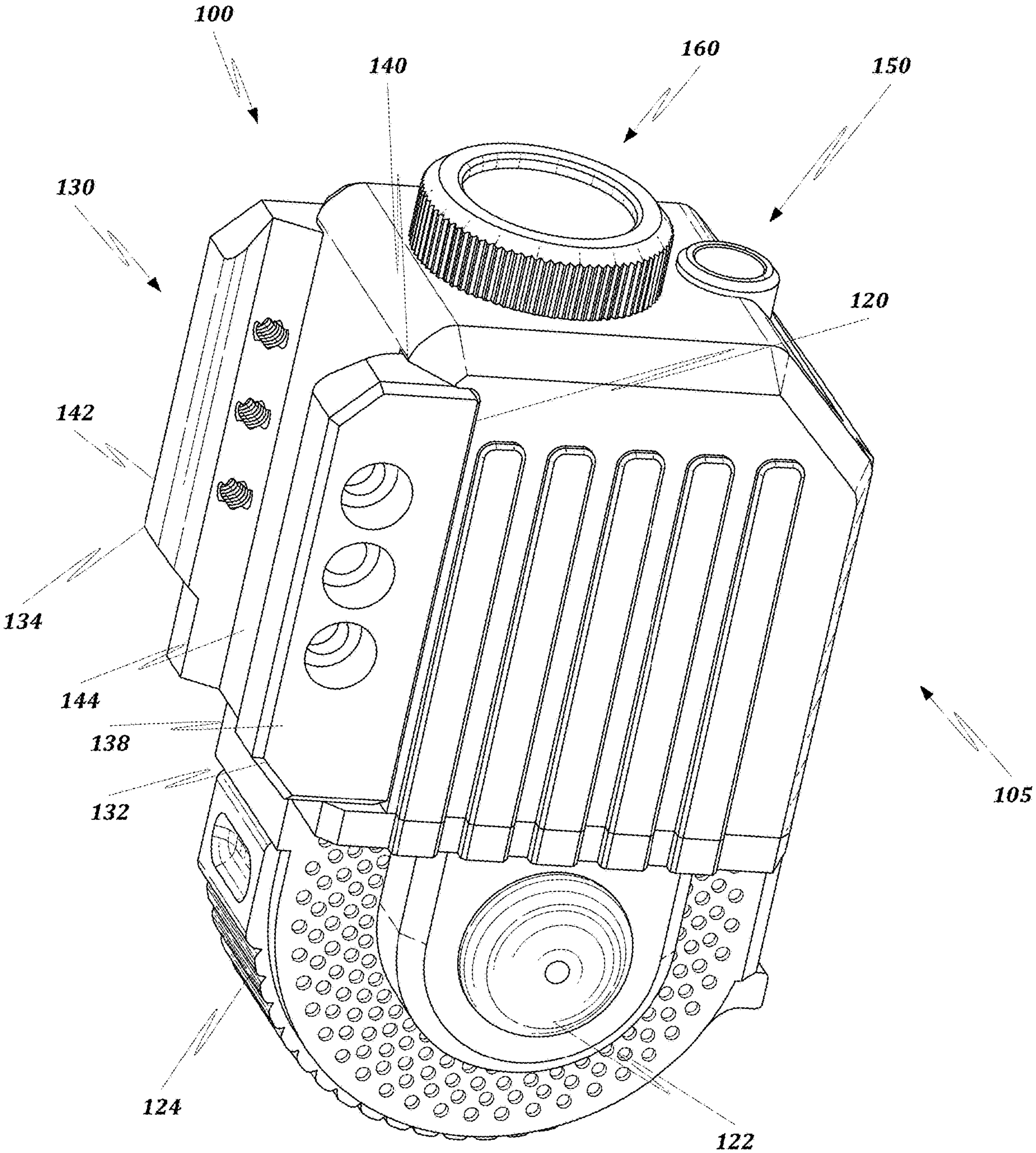
FIG. 9 is a perspective view of a third embodiment of a tracking device coupling mechanism.
Figure 10:
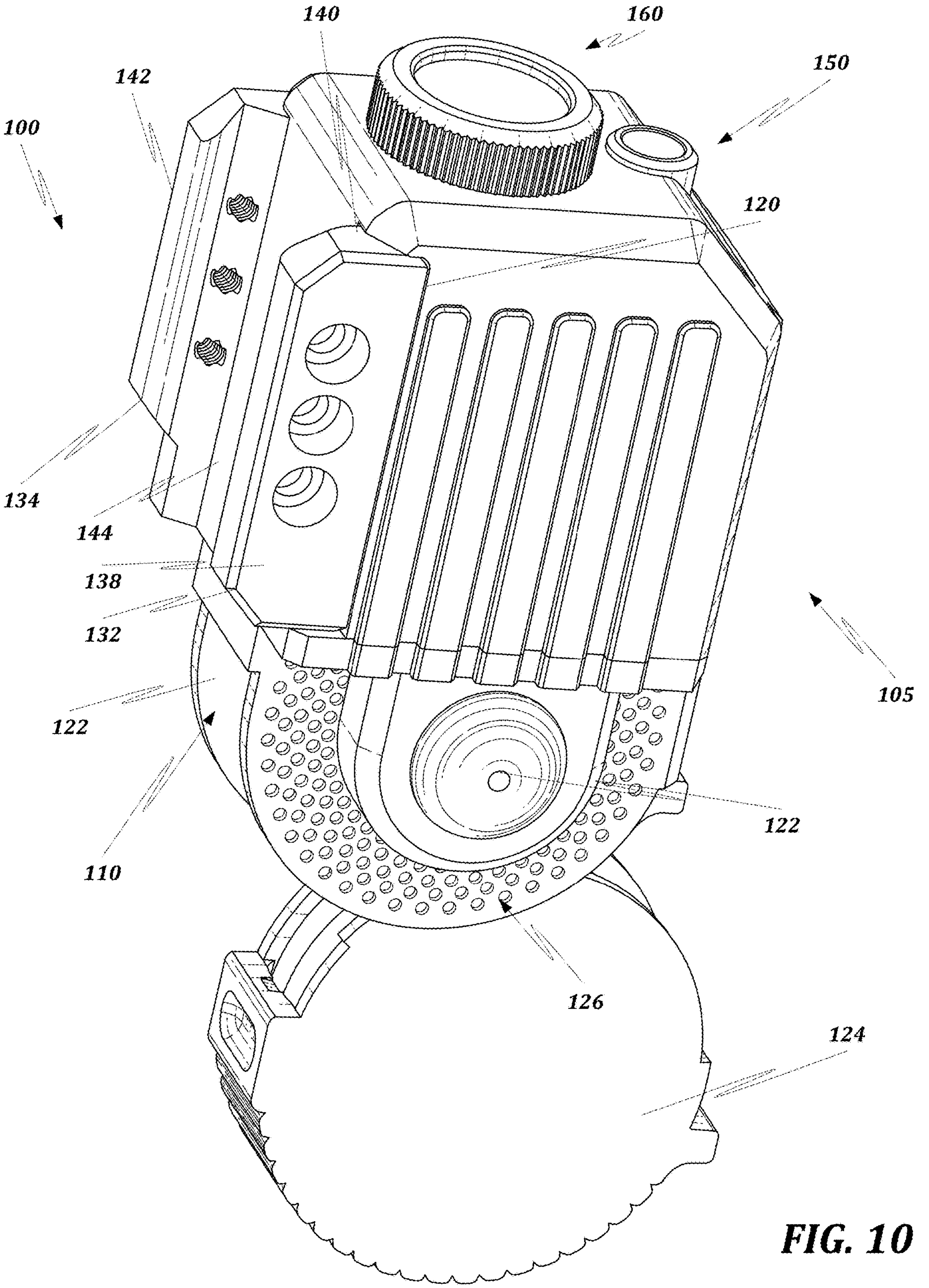
FIG. 10 is a perspective view thereof showing a cassette in an extended position.
Figure 11:
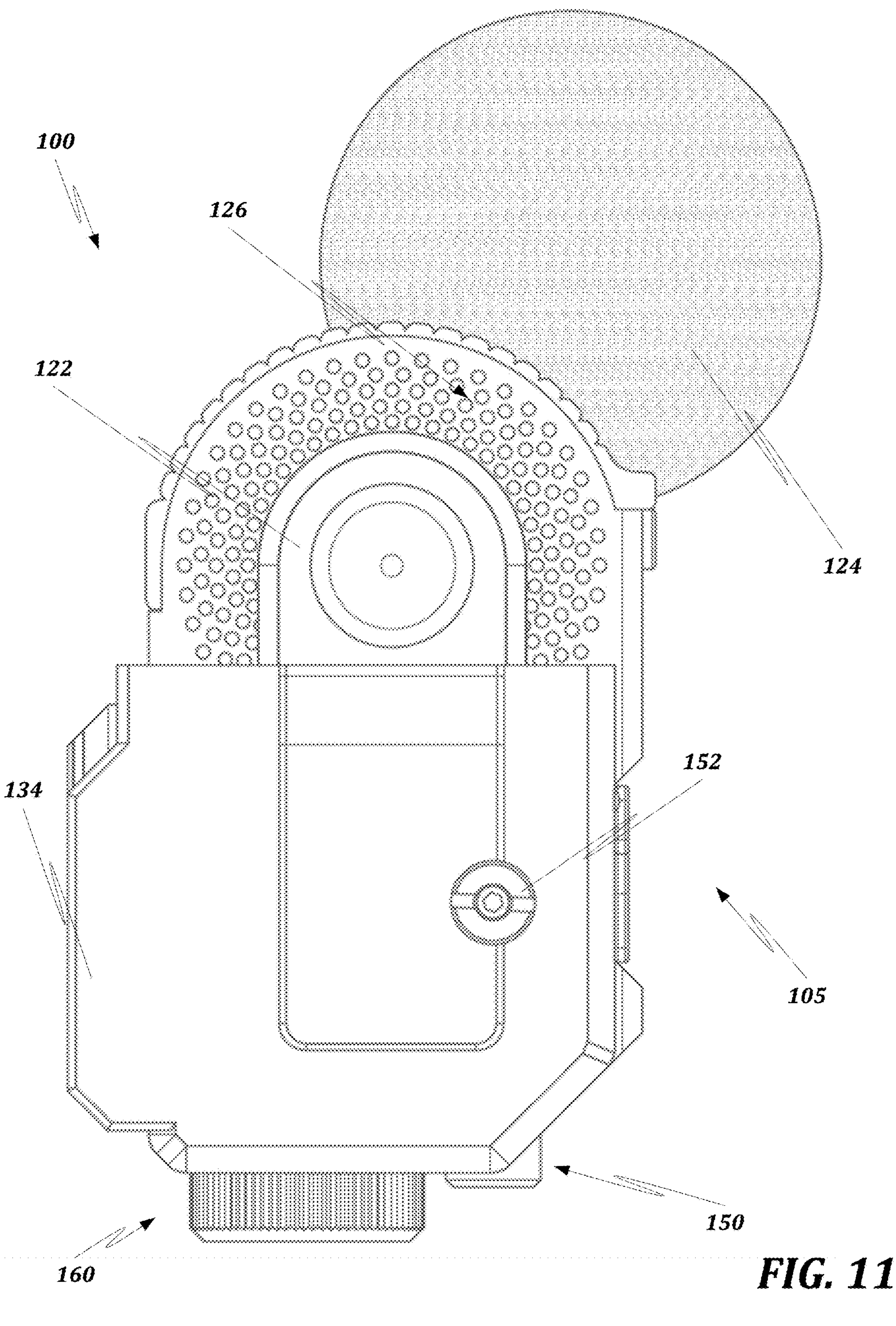
FIG. 11 is a side view thereof showing the cassette in the extended position.

In some embodiments, as shown in FIGS. 6-8, the laser emitter 150 may be formed as a separate unit that attaches to the body 105. Alternatively, as shown in FIGS. 9-12, the laser emitter 150 may be integrated into the body 105.

E. A Flashlight

As shown in FIGS. 9-12, the tracking device coupling mechanism 100 may optionally include a flashlight 160. The flashlight 160 may be configured to emit one or more of white light, colored light, coherent light. Incoherent light, light in the visible spectrum, infrared light, ultraviolet light, and/or any other. For example, the flashlight 160 may emit light in the visible spectrum, such as red light or shite light. Additionally or alternatively, the flashlight 160 may be configured to emit infrared light (e.g., for use with a night vision device). The flashlight 160 may be configured to emit light to illuminate an area generally in front of the mechanism 100 (and an object attached thereto). In embodiments, inclusion of the flashlight 160 may allow the tracking device coupling mechanism 100 to function as a portable light accessory in addition or instead of retaining a tracking device.

In some embodiments, as shown in FIGS. 9-12, the flashlight 160 may be integrated into the body 105. Alternatively, the flashlight 160 may be formed as a separate unit that attaches to the body 105.

F. A Motion Sensor

In some embodiments, the tracking device coupling mechanism 100 may optionally include a motion sensor. The motion sensor may include, as non-limiting examples, a gyroscopic sensor, an accelerometer, a velocity sensor, a vibration sensor, and/or any other sensor for detecting movement of an object to which it is attached. Because the body of the tracking device coupling mechanism 100 is fixed relative to the object to be tracked, a motion sensor may be used to detect motion of the body 105, which may correspond to motion of the object to be tracked.

III. APPARATUS/SYSTEM USE

The following depicts an example of a method of a plurality of methods that may be performed by and/or using at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Consistent with embodiments of the present disclosure, a method may be performed by at least one of the aforementioned components. The method may comprise the following stages:

1. receiving a tracking device within a cavity or receptacle;
2. enclosing the tracking device within the receptacle;
3. positioning the body such that the body abuts at least one side of an item to be tracked;
4. engaging the attachment mechanism to immobilize the receptacle relative to the item;
5. tracking the item based on the tracking device;
6. disengaging the attachment mechanism;
7. removing the body from the item; and
8. removing the tracking device from the cavity.

Figure 13:
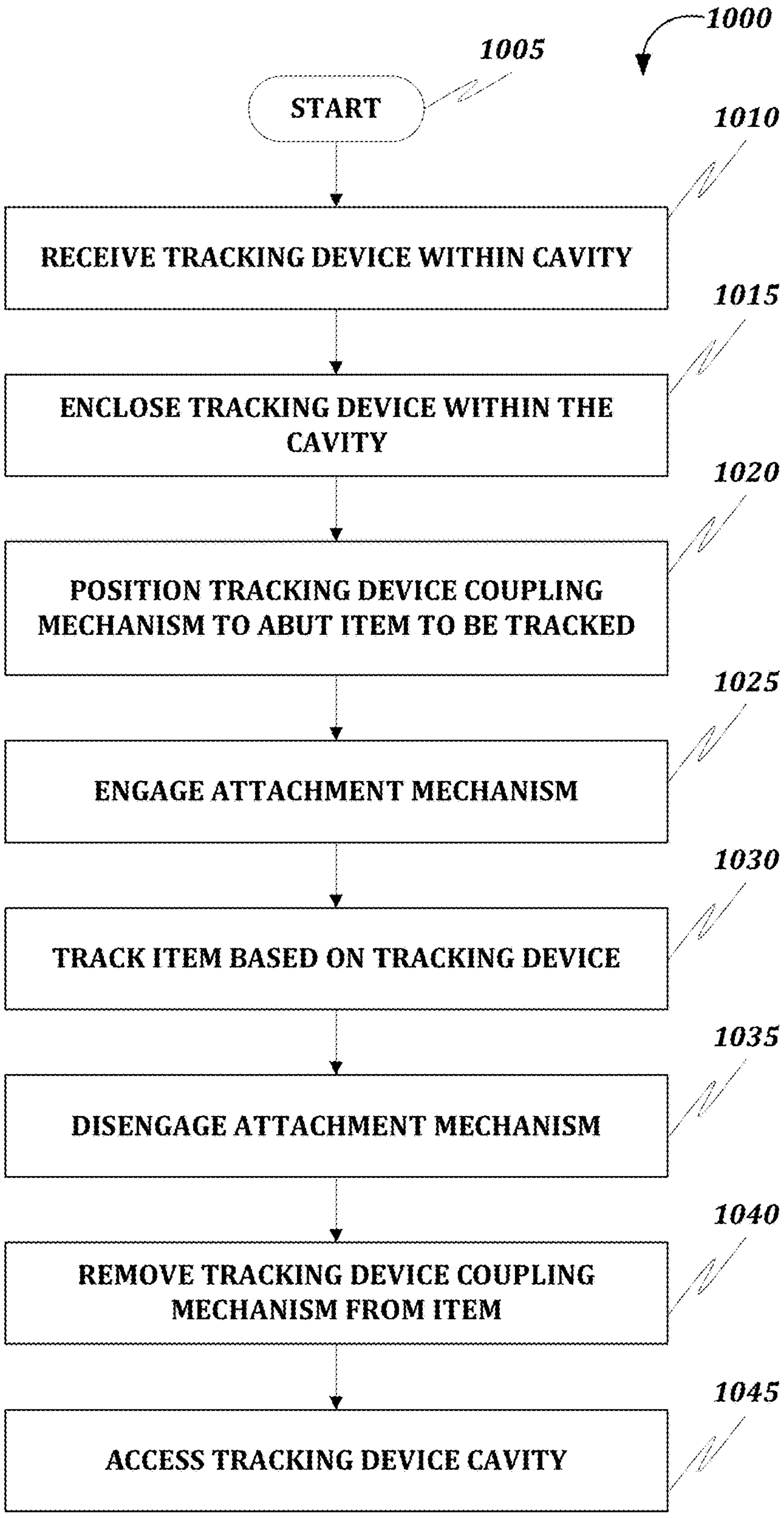
FIG. 13 is a flowchart illustrating a method of use of the tracking device coupling mechanism.

In particular, FIG. 13 is a flow chart setting forth the general stages involved in a method 1000 consistent with an embodiment of the disclosure for providing and/or using the tracking device coupling mechanism 100.

Method 1000 may begin at starting block 1005 and proceed to stage 1010 where a tracking tag may be inserted into a cavity defined by a receptacle in the tracking device coupling mechanism. For example, in some embodiments a user may disassemble a body portion of the tracking device coupling mechanism, removing one or more screws to separate a base from a cap. In some embodiments, a proprietary or specialized driver may be needed for driving the one or more screws. A tracking device may be inserted into a cavity defined by the base and/or the cap. Alternatively, the user may extend a cassette to an open position to allow for loading of the tracking device into the cassette. In some embodiments, extending the cassette may include loosening or removing a set screw to allow the cassette to pivot about a pivot point. A proprietary or specialized driver may be needed for driving the setscrew.

In stage 1015, the user may enclose the tracking tag within the cavity. For example, in some embodiments the user may enclose the tracking tag between a base portion and a cap portion of the body. The user may connect the base to the cap using one or more screws. In some embodiments, a proprietary or specialized driver may be needed for driving the one or more screws. Alternatively, the user may move the cassette to a closed position within a cavity defined by the body. In some embodiments, the user may adjust a set screw to prevent, limit, or otherwise inhibit further movement of the cassette. A proprietary or specialized driver may be needed for driving the set screw.

Figure 4:
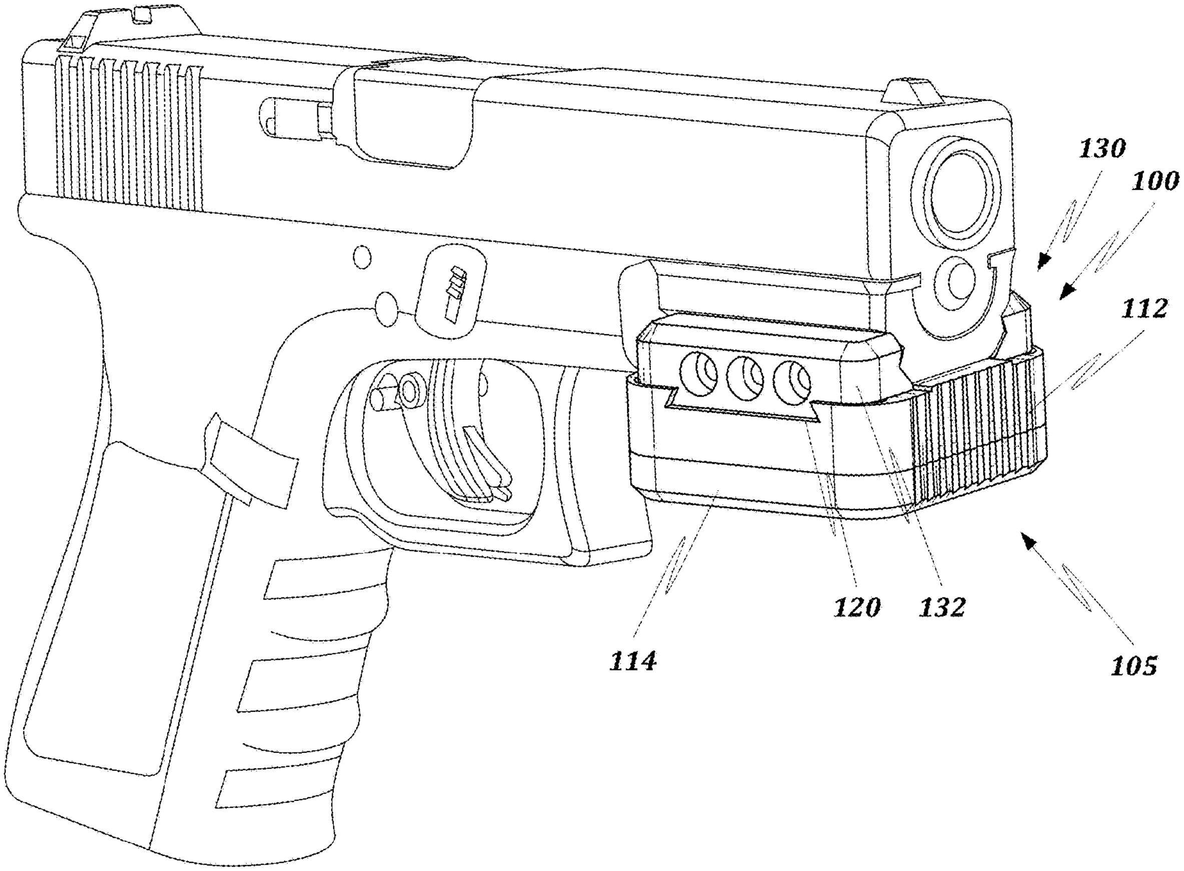
FIG. 4 is a perspective view showing the first embodiment of the tracking device coupling mechanism attached to a firearm.
Figure 5:
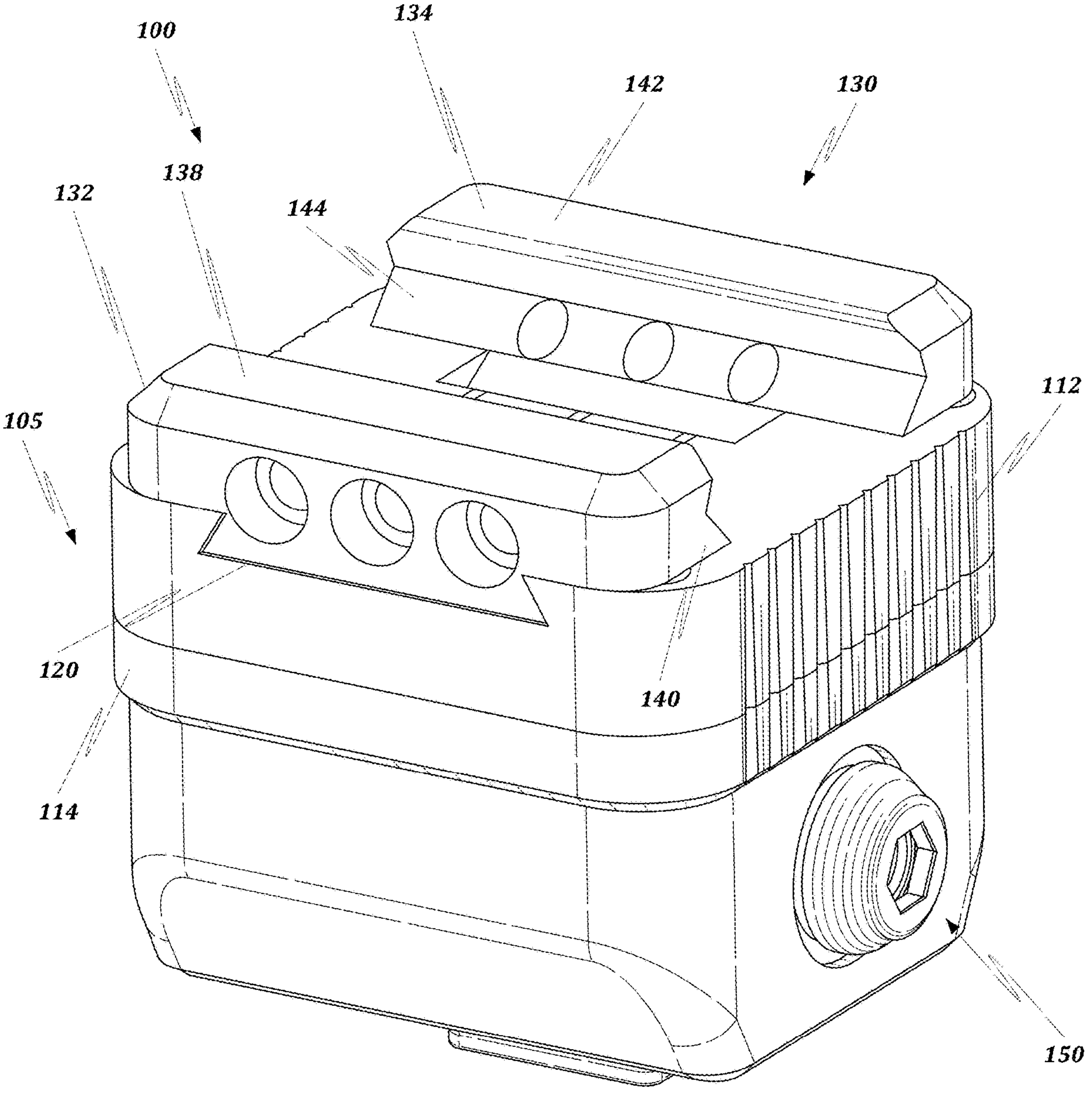
FIG. 5 is a perspective view of a second embodiment of a tracking device coupling mechanism.
Figure 12:
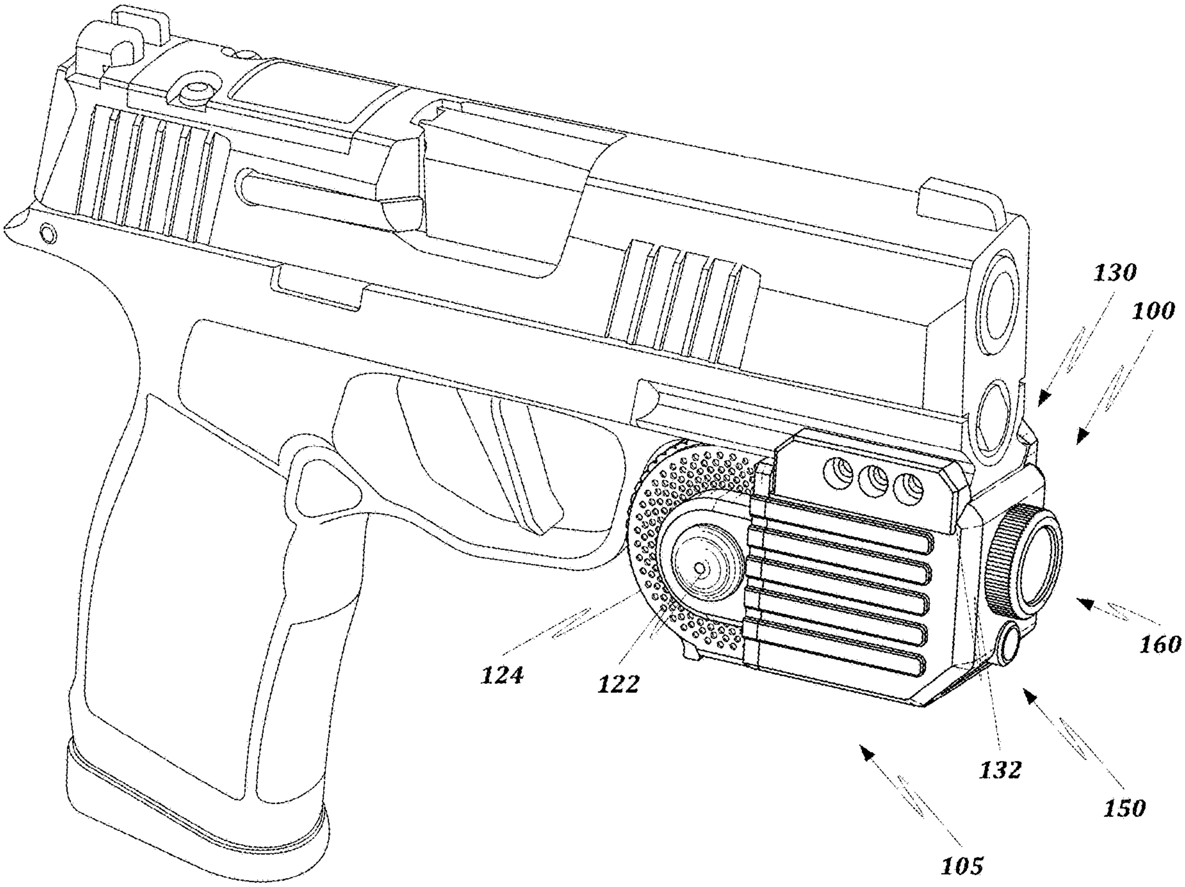
FIG. 12 is a perspective view showing the third embodiment of the tracking device coupling mechanism attached to a firearm.

In stage 1020. The user may adjust a position of the tracking device coupling mechanism such that the body abuts at least one side of an item to be tracked. In particular, the body may abut the object to be tracked, and at least a portion of the object may be disposed inside an attachment mechanism of the tracking device coupling mechanism. For example, a portion of the object may be disposed between two arms of the attachment mechanism. As a particular example, where the object to be tracked is a firearm, the tracking device coupling mechanism may be positioned such that the body abuts the barrel of the firearm and at least a portion of an accessory rail is disposed between the arms of the attachment mechanism, as shown in FIGS. 4, 8, and 12.

In stage 1025, the user may engage the attachment mechanism to immobilize the tracking device coupling mechanism relative to the object to be tracked. For example, the user may tighten one or more adjusting screws on the attachment mechanism to reduce a space between arms of the attachment mechanism, thereby clamping the object to be tracked between the arms. Additionally or alternatively, one or more screws may operate as set screws so that the screw presses against the object to be tracked. As another example, a shackle can be closed to engage a locking mechanism within a lock body, coupling the tracking device coupling mechanism to the item to be tracked. As shown in FIGS. 4, 8, and 12, when the attachment mechanism is engaged, the tracking device coupling mechanism is retained on the firearm, affixing the tracking device coupling mechanism to the firearm so that the tracking device coupling mechanism is substantially immobilized relative to the firearm.

In some embodiments, when the tracking device coupling mechanism is immobilized relative to the object to be tracked, at least a portion of the object may physically block access to the cavity of the tracking device coupling mechanism. In this way, anyone other than the owner of the device may be prevented from accessing, removing, tampering with, destroying, and/or otherwise interacting with the tracking device within the tracking device coupling mechanism.

In stage 1030, the user may track the item based on the tracking device. Various tracking devices may allow for software and/or hardware-based tracking, and may provide approximate or exact locations. Those of skill in the art will recognize that various tracking methodologies are known in the art and contemplated in this invention.

In stage 1035, the user may disengage the attachment mechanism to uncouple the tracking device from the item to be tracked. Disengaging the attachment mechanism may include, but need not be limited to, using a special or proprietary driver to remove or adjust an anti-theft screw, using a key to disengage a locking mechanism, entering a numeric code or combination to disengage the locking mechanism, removing one or more anti-theft screws or security screws to disengage a bracket, or any other method of disengaging the attachment mechanism to release the shackle or bracket.

In this way, the tracking device coupling mechanism is free to be moved relative to the item to be tracked.

In stage 1040, the user may adjust a position of the tracking device coupling mechanism such that the body no longer abuts the item to be tracked. Removing the tracking device coupling mechanism frees the tracking device coupling mechanism to be manipulated by the user.

The user may manipulate the tracking device coupling mechanism to access the receptacle or cavity therein. For example, in some embodiments a user may disassemble a body portion of the tracking device coupling mechanism, removing one or more screws to separate a base from a cap. In some embodiments, a proprietary or specialized driver may be needed for driving the one or more screws. A tracking device may be inserted into a cavity defined by the base and/or the cap. Alternatively, the user may extend a cassette to an open position to allow for loading of the tracking device into the cassette. In some embodiments, extending the cassette may include loosening or removing a set screw to allow the cassette to pivot about a pivot point. A proprietary or specialized driver may be needed for driving the set screw.

In stage 1045 the user may access the tracking device. For example, the user may extract the tracking device from the receptacle of the tracking device coupling mechanism and/or remove the tracking device from the cassette. In embodiments, the tracking device may be extracted to charge the tracking device, to change a battery associated with the tracking device, to adjust one or more tracking device settings that require accessing the hardware, to change and/or replace the tracking device, and/or any other reason a user may desire to access the tracking device.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A tracking device coupling mechanism comprising:

a body at least partially defining a cavity configured to receive and retain a tracking device wherein the body comprises:

a base that is removably attachable to an attachment mechanism, and a cap removably attachable to the base, wherein the cavity is defined between the base and the cap;

the attachment mechanism connected to the body, the attachment mechanism having:

a first arm configured to slide inward towards a centerline of the body from a first side, a second arm configured to oppose the first arm and slide inward towards the centerline of the body from a second side, and a tamperproof screw removably connecting the first arm to the second arm such that rotation of the tamperproof screw adjusts a distance between the first arm and the second arm;

wherein the cap is removable attachable to the base using one or more screws inserted into the base and extending into the cap, and wherein heads of the one or more screws are covered by the attachment mechanism when the attachment mechanism is installed on the base, wherein at least a portion of an item to be tracked is configured to be retained between the first arm and the second arm, and wherein, when the attachment mechanism retains the body in an engaged state, the tracking device coupling mechanism is immobilized with respect to the item to be tracked.

2. The tracking device coupling mechanism of claim 1, wherein at least a portion of the body is formed from a material that permits passage of electromagnetic radiation therethrough.

3. The tracking device coupling mechanism of claim 2, wherein the portion of the body is formed from plastic.

4. The tracking device coupling mechanism of claim 2, wherein the cavity is open on at least one side, and wherein the body comprises a cassette hingedly mounted within the cavity, the cassette being configured to retain the tracking device therein and to rotate between:

a first position within the body, and a second position outside of the body.

5. The tracking device coupling mechanism of claim 4, wherein a set screw is configured to selectively inhibit rotation of the cassette.

6. The tracking device coupling mechanism of claim 1, wherein the attachment mechanism cannot be removed from the body while the tamperproof screw is retained in both the first arm and the second arm.

7. The tracking device coupling mechanism of claim 1, wherein the tamperproof screw comprises a screw having a drive selected from one of:

a snake eye drive, a security Torx drive, a security hex drive, a 5-lobe Torx drive, a one-way clutch drive, a sentinel drive, a 7-point drive, or a proprietary drive.

8. The tracking device coupling mechanism of claim 1, wherein the item to be tracked comprises a firearm.

9. The tracking device coupling mechanism of claim 8, wherein the first arm and the second arm are configured to retain a portion of an accessory rail of the firearm therebetween, such that the body is not moveable relative to the firearm.

10. The tracking device coupling mechanism of claim 1, wherein the one or more screws comprise one or more tamperproof screws.

11. The tracking device coupling mechanism of claim 10, wherein the one or more tamperproof screws of the body use a same driver as the tamperproof screw of the attachment mechanism.

12. The tracking device coupling mechanism of claim 1, further comprising a laser emitter attached to the body by the one or more screws, the laser emitter disposed adjacent to the cap.

13. A tracking device coupling mechanism comprising:

a body at least partially defining a cavity configured to receive and retain a tracking device, wherein the cavity is open on at least one side, and wherein the body comprises a cassette hingedly mounted within the cavity, the cassette being configured to retain the tracking device therein and to rotate between:

a first position within the body, and a second position outside of the body:

an attachment mechanism connected to the body, the attachment mechanism having:

a first arm configured to slide inward towards a centerline of the body from a first side, a second arm configured to oppose the first arm and slide inward towards the centerline of the body from a second side, and a tamperproof screw removably connecting the first arm to the second arm such that rotation of the tamperproof screw adjusts a distance between the first arm and the second arm;

wherein while the attachment mechanism attaches the tracking device coupling mechanism to an item to be tracked, at least a portion of the item to be tracked inhibits rotation of the cassette, wherein at least a portion of the item to be tracked is configured to be retained between the first arm and the second arm, and wherein, when the attachment mechanism retains the body in an engaged state, the tracking device coupling mechanism is immobilized with respect to the item to be tracked.

14. The tracking device coupling mechanism of claim 13, further comprising a laser emitter.

15. The tracking device coupling mechanism of claim 14, wherein an adjusting screw allows for adjusting an aim of the laser emitter.

16. The tracking device coupling mechanism of claim 13, further comprising a flashlight.

17. The tracking device coupling mechanism of claim 16, wherein the flashlight emits white light.

18. The tracking device coupling mechanism of claim 13, wherein at least a portion of the body is formed from a material that permits passage of electromagnetic radiation therethrough.

19. The tracking device coupling mechanism of claim 13, wherein a set screw is configured to selectively inhibit rotation of the cassette.

* * * * *